Nov. 17, 1936.          M. EWALD          2,060,802
PROCESS OF KNIFE MANUFACTURE
Filed Feb. 15, 1934
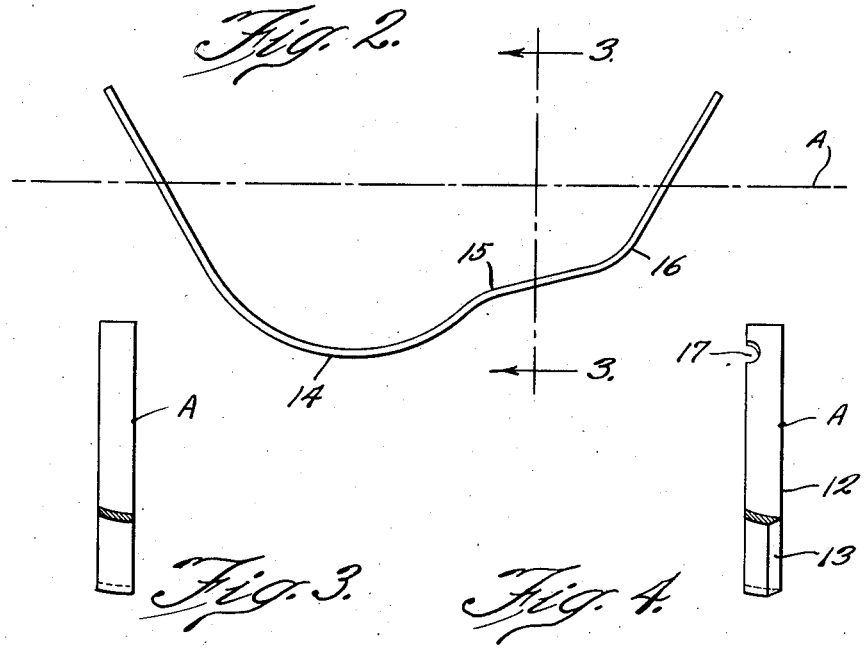
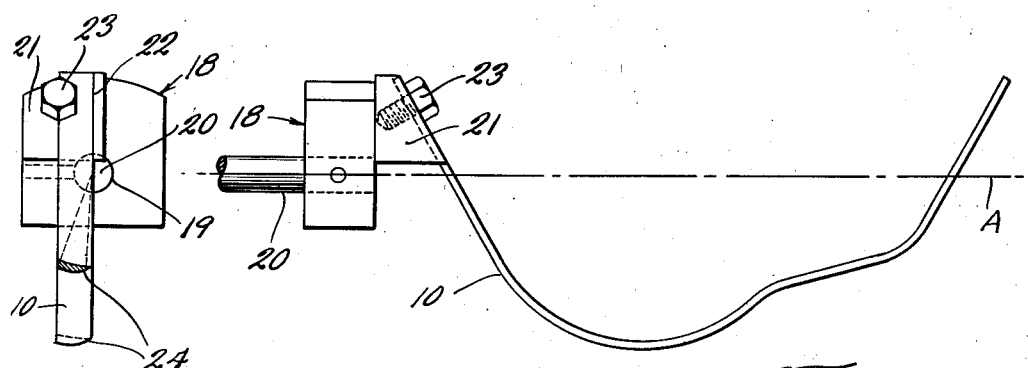
Inventor:
Mark Ewald

UNITED STATES PATENT OFFICE 2,060,802

PROCESS OF KNIFE MANUFACTURE

Mark Ewald, Olympia, Wash., assignor to Special Equipment Company, Portland, Oreg., a corporation of Oregon Application February 15, 1934, Serial No. 711,354

9 Claims. (Cl. 76—104)

This invention has to do with a device for the treating of fruit preparatory to canning and relates particularly to a rotatable knife adapted to remove the peel from the fruit.

The invention herein relates to the process of manufacturing a peeling knife for peeling fruit.

The peeling knife manufactured in the manner hereinafter disclosed is particularly designed to cooperate with a fruit holding cup for removing the epidermis from a half fruit held within a cup in a manner exposing the flat severed face and with the epidermis engaging the cup walls, which latter conform generally to the periphery of the fruit. The knife is disposed for rotation about an axis substantially within the plane face of the fruit to carry its thin ribbon-like body along the inner side of the walls of the cup and through the meat of the fruit just beneath the surface of the epidermis.

For an understanding of a cup in which the knife here described is useful and is claimed, reference may be had to the copending application of Mark Ewald, serially numbered 627,549, filed August 5, 1932, entitled Fruit holding cup, and of which application the present is a continuation in part.

A complete knowledge of the machine with which the present invention is adapted to be combined may be had by reference to a co-pending application of Mark Ewald, serially numbered 636,447, filed October 6, 1932, and entitled "Pear treating apparatus".

Among the objects of the present invention is the provision of:

A novel mode of manufacturing a fruit peeling knife of the character herein described.

This object and such other objects as may hereinafter appear are obtained by the novel construction, unique arrangement, and improved combination of elements illustrated in the accompanying one sheet of drawings, hereby made a part of this application, and in which:

Figure 1 is a plan view of a blank of metal from which the improved knife may be made;

Figure 2 is a side view of the blank of Figure 1 subsequent to it being distorted to approximate the shape of the finished article;

Figure 3 is a transverse sectional view of the unfinished knife taken at the line 3—3 of Figure 2;

Figure 4 is a view similar to Figure 3 but after a partial sharpening of the knife;

Figure 5 is a fragmentary view of the finished knife, showing the manner of attachment to means for its rotation;

Figure 6 is a left side view of the parts shown in Figure 5.

Like reference characters are used to designate similar parts in the drawing and in the description of the invention which follows.

The blank from which blade 10 is made is shown at the initial stage of its manufacture in Figure 1. Such blank is in the form of a long rather narrow strip 11 of suitable metal. The thickness of the strip 11 depends upon its length and the size desired in the finished article. At present knives like the one illustrated are made in four sizes, the material being stainless cutlery steel. In the smallest size of knife, the steel strip 11 generally is .042 of an inch in thickness. In the largest of the four sizes of knives, the metal strip 11 generally has an original thickness of .065 of an inch.

After the strip 11 has been obtained, as by shearing or stamping it from a larger piece of sheet material, the strip is subjected to the action of complemental swaging tools whereby it is deformed longitudinally into the shape illustrated in Figure 2. In addition to the longitudinal curvature given to the blade, shown in Figure 2, the blank is given a slight curve transversely of its body, as shown in Figure 3. In Figures 2, 3 and 4, the axis of rotation of the blade, when it is finished, is indicated by a broken line and dot designated by the character "A". The cutting edge of the blade lies in a plane passing through the axis of rotation of the blade. The curvature of the blade in a direction transverse to the length of the blade is such that the transverse curvature at all points on the inner face of the blade focuses upon the axis of rotation of the blade as shown in Figure 5. In other words, this dished or concave curvature of the inner face of the blade in the transverse direction is so shaped as to be a segment of a true circle, the radius of which is the distance from any point on this transverse curvature to the axis of rotation and due to the irregular bowed nature of the blade, as seen in Figure 2, when the blade is used as a pear peeling blade, the various transversely curved sections 14, 15, and 16 will include varying radii perpendicular to this axis of rotation. Such is true for the whole length of that section of the blade lying to one side of the axis of rotation.

Figure 4 is a view similar to Figure 3 but illustrates the unfinished blade after it has been partly ground (13) along its leading edge 12. In forming the section 13, which is coextensive with sections 14, 15 and 16 of the blade, about two-thirds the thickness of the material is removed at the lower part of the leading edge 12, the face 13 extending backwardly about one-third of the width of the blade. At this time notches 17 may be formed at opposite ends of the blade to facilitate attachment to blocks 18 for rotation, one block being shown in Figures 5 and 6.

The notches 17 are so placed that the axis "A" of the blade will coincide with the center of a shaft opening 19 in each of the blocks 18, such openings receiving shafts 20 for rotating the blocks 18.

After the face 13 and the notches 17 have been formed in the blank, the blade is subjected to a suitable heat treatment for tempering. A satisfactory heat treating process has been found to include the steps of heating the blade to 1725° Fahrenheit, then quenching in oil and leaving the article in oil of 400° Fahrenheit for a short period of time. This being done, the knife is placed in a suitable device, not shown, for oscillating it about axis "A" while a small grinding member is moved back and forth along its inner face. In this manner, the inner face of the blade is given a surface which at all points focuses truly upon the axis "A" of rotation. The grinding is so accomplished as to make the inner surface of sections 14, 15 and 16 of the blade correspond to a segment of a true circle with varying radii perpendicular to the axis of rotation "A" and the centers of these radii coincide with and fall upon the center line of the axis of rotation.

Next, the face of the outer section 13 of the blade is rounded as shown in Figure 5 adjacent the leading edge 12 thereof so that the outer face converges upon the inner face and forms a cutting edge, the cutting edge being substantially flush with the inner face. Figure 5 illustrates a cross section of a finished blade intermediate its length.

Figure 6 is a side view of one of the blocks 18 to which the blade 10 is attached for rotation. The block 18 receives a rotating shaft 20 in its shaft opening 19. Any suitable fastening means, as a pin, may be used therebetween. A lug 21 projecting from the block has an inclined face traversed by a groove 22 into which groove the end of the blade beyond its cutting edge may be seated. A cap screw 23 passing through the notch 17 detachably holds the blade in place upon the block 18. The other end of the blade 10 may be similarly attached to a complemental block 18, not shown.

By shaping the inner face of the blade 10 about the axis of rotation "A", the knife when passed through the body of a fruit, will glide freely along the periphery of the portion of the fruit from which the peel has been severed, the body of the knife not crowding or distorting the body of the fruit from which the peel is separated. The trailing section of the face of the blade will be at the same radius from the axis of rotation of the blade as the leading and cutting edge portion and hence there will be no tendency for the body portion to squeeze or bruise the useful section of fruit. The radius at which the outer face of the knife swings or rotates is such as to carry that face a small fraction of an inch from the inner wall of the cup that holds the fruit. No claim herein is made to the peeling knife per se since the subject matter thereof is claimed as an article of manufacture in my co-pending application 750,151, filed October 26, 1934, and entitled "Peeling knife".

What is claimed as new and is desired to be secured by Letters Patent of the United States is:

1. The process of manufacturing a rotatable peeling knife that includes the successive steps of deforming a strip-like blank of metal into a configuration corresponding to a narrow peripheral section of an article whose peel is to be removed, determining points upon the deformed blank intersected by the axis of rotation of said blade, and removing material from said blank to provide a periphery therefor of transverse sections characterizing arcs about such axis pursuant to forming a cutting edge upon the blank.

2. That process of manufacturing a rotatable peeling knife from a blank strip of metal and which comprises the steps of deforming said strip into a formation substantially simulating a narrow band of peripheral elements extending between antipodal regions of an article to be peeled, determining complemental sections upon said deformed strip with respect to the axis about which said strip is to rotate when completed into said blade and for the attachment of rotating means thereto, and thereafter removing material from said strip to effect a surface therealong of curved transverse sections having a foci in such axis of rotation.

3. That process of manufacturing a rotatable peeling knife from a single blank strip of metal and which comprises the steps of selectively deflecting the central portion of said strip to one side of an axis of rotation traversing the end sections thereof, and thereafter sharpening an edge of the deflected section by removing material along the inner face thereof to effect a periphery of arcuate transverse sections having respective foci in such axis and removing material from the outer face of said deflected portion to form the sharpened edge flush with such periphery.

4. That process of manufacturing from a single blank strip of metal a peeling knife rotatable about an axis, and which comprises the steps of selectively bowing said strip, determining points substantially at the leading edge and near the ends of said strip for coincidence with such axis, and thereafter sharpening the edge by removing material from the concave face of said strip to form a longitudinal surface of arcuate transverse sections having respective foci in such axis and removing material from the convex face of said strip to provide the cutting line of the edge being flush with such longitudinal surface.

5. That process of manufacturing a peeling knife rotatable about an axis and which comprises the successive steps of selectively deforming a narrow blank strip of metal to form a bowed section therein with a leading edge substantially subtending such axis, determining sections of said strip with respect to such axis for the attaching of rotating means, and thereafter sharpening the cutting edge of said strip by removing material from the concave face of such bowed section to impose transverse peripheral elements therein having respective foci in such axis and removing other material from the strip to cause the convex face of said bowed section to converge upon the concave face at such edge.

6. That process of manufacturing a peeling knife rotatable about an axis and which comprises the successive steps of deforming a narrow blank strip of metal to effect a bowed section therein of selected contour, determining the position of such axis so that it will subtend an edge of the bowed section, heating and quenching said strip for the tempering thereof, and thereafter sharpening such edge by removing material from the concave face of the bowed section to effect arcuate transverse peripheral elements therein having respective foci in such axis and removing material from the opposite face of said strip at such section to cause it to converge on the first face at such edge.

7. That process of manufacturing a peeling knife rotatable about an axis and which comprises the successive steps of deforming a narrow blank strip of metal to effect a bowed section therein of selected contour, determining the position of such axis so that it will subtend an edge of the bowed section, effecting means in said strip at opposite ends of the bowed section and with respect to the axis of rotation for the attaching of rotating means, heating and quenching said strip for the tempering thereof, and thereafter sharpening such edge by removing material from the concave face of the bowed section of the strip to effect arcuate transverse peripheral elements therein having respective foci in such axis and removing material from the opposite face of said strip at such section to cause it to converge on the first face at such edge.

8. The herein described process of manufacturing a peeling knife rotatable about an axis and which consists of the steps of deforming a narrow blank strip of metal to configure substantially the contour of a peripheral section extending antipodally of an article whose epidermis is to be removed, determining points within a common edge and near opposite ends of the deformed portion in said strip for coinciding with such axis by providing means for the operative engagement of means for rotating the strip, removing material from the outer face of said strip (the face most distant from the axis) and near such edge for the thinning thereof, heating and quenching said strip to effect a tempering thereof, and moving said strip about the axis while sharpening such edge by removing material from the opposite or inner face of said strip to impart a contour thereto of arcuate elements extending transversely of the strip to focus upon such axis, and removing other material from the strip to cause the outer face thereof to converge upon the inner face at such edge.

9. Process of forming a fruit peeling knife rotatable about an axis which includes deforming an elongated, relatively thin and narrow strip of metal to correspond with the curved surface of a half section of fruit, curving the inner face of the strip in a direction transversely of its length in such a manner that the radius of curvature passes through the axis of rotation of the knife, converging the front portion of the outer face of the strip at an acute angle to the plane of the inner face so that said converged portion merges into the plane of the front portion.

MARK EWALD.